US008300610B2

(12) United States Patent
Tsudaka

(10) Patent No.: US 8,300,610 B2
(45) Date of Patent: Oct. 30, 2012

(54) SYNCHRONIZATION DEVICE AND SYNCHRONIZATION METHOD

(75) Inventor: Kentaro Tsudaka, Nishinomiya (JP)

(73) Assignee: Furuno Electric Company, Limited, Nishinomiya (JP)

( * ) Notice: Subject to any disclaimer, the term of this patent is extended or adjusted under 35 U.S.C. 154(b) by 333 days.

(21) Appl. No.: 12/810,552

(22) PCT Filed: Dec. 26, 2008

(86) PCT No.: PCT/JP2008/073840

§ 371 (c)(1), (2), (4) Date: Aug. 3, 2010

(87) PCT Pub. No.: WO2009/084676

PCT Pub. Date: Jul. 9, 2009

(65) Prior Publication Data

US 2010/0322208 A1 Dec. 23, 2010

(30) Foreign Application Priority Data

Dec. 28, 2007 (JP) ................................ 2007-340558

(51) Int. Cl.
*H04J 3/00* (2006.01)

(52) U.S. Cl. ........................................ 370/336; 370/345

(58) Field of Classification Search ........................ None
See application file for complete search history.

(56) References Cited

U.S. PATENT DOCUMENTS 5,231,400 A * 7/1993 Mouldin et al. ................ 342/45
5,396,496 A * 3/1995 Ito et al. ........................ 370/314
5,610,911 A * 3/1997 Ishikawa et al. .............. 370/503
5,615,235 A * 3/1997 Kakuishi et al. .............. 375/355
5,962,833 A * 10/1999 Hayashi ........................ 235/384
6,009,131 A * 12/1999 Hiramatsu .................... 375/354
6,133,867 A * 10/2000 Eberwine et al. ............... 342/29
6,271,773 B1 * 8/2001 Kobayashi ...................... 341/51

(Continued)

FOREIGN PATENT DOCUMENTS

GB 2265280 A * 9/1993

(Continued)

OTHER PUBLICATIONS

Choi et al., "Time Synchroonization Module for Automatic Identification system (AIS)," 2003, Wuhan University Journal of Natural Sciences, vol. 8, No. 2B, 6 pages.*

*Primary Examiner* — Bunjob Jaroenchonwanit
(74) *Attorney, Agent, or Firm* — Birch, Stewart, Kolasch & Birch, LLP

(57) ABSTRACT

There is provided a synchronization device capable of, even when transmission timings of a plurality of other ships are different, almost reliably synchronizing with the other ships during a transmission of a ship concerned and is also provided a synchronization method. The synchronization device 1, when the ship concerned performs a transmission, obtains timing differences DTi occurring over the past one minute from the transmission timing of the ship concerned (S102) and creates a histogram of the timing differences DTi (S103). The synchronization device 1 selects a class with the highest frequency from classes of the timing differences DTi (S104) and obtains a corrected timing DT' associated with the selected class (S105). The synchronization device 1 corrects a reference timing of the transmission of the ship concerned using the corrected timing DT' and performs the transmission of the ship concerned (S106).

3 Claims, 4 Drawing Sheets

U.S. PATENT DOCUMENTS

| | | | | |
|---|---|---|---|---|
| 6,611,755 | B1 * | 8/2003 | Coffee et al. | 701/482 |
| 7,336,643 | B2 * | 2/2008 | Hiraoka et al. | 370/350 |
| 8,058,994 | B2 * | 11/2011 | Aguirre et al. | 340/572.1 |
| 2002/0001299 | A1 * | 1/2002 | Petch et al. | 370/350 |
| 2004/0146043 | A1 * | 7/2004 | Hiraoka et al. | 370/350 |
| 2005/0041692 | A1 * | 2/2005 | Kallstenius | 370/503 |
| 2007/0040734 | A1 * | 2/2007 | Evers et al. | 342/126 |
| 2007/0109192 | A1 * | 5/2007 | Riley et al. | 342/451 |
| 2007/0194979 | A1 * | 8/2007 | Hiraoka | 342/46 |
| 2007/0218931 | A1 * | 9/2007 | Beadle et al. | 455/502 |
| 2011/0092223 | A1 * | 4/2011 | Nakagawa et al. | 455/456.1 |
| 2011/0176534 | A1 * | 7/2011 | Subramanian et al. | 370/350 |
| 2011/0224844 | A1 * | 9/2011 | Farwell et al. | 701/2 |
| 2012/0032855 | A1 * | 2/2012 | Reede et al. | 342/458 |

FOREIGN PATENT DOCUMENTS

| | | | |
|---|---|---|---|
| JP | 2003-163646 | A | 6/2003 |
| JP | 2006-186766 | A | 7/2006 |
| JP | 3882025 | B1 | 2/2007 |

* cited by examiner

SYNCHRONIZATION DEVICE AND SYNCHRONIZATION METHOD

TECHNICAL FIELD

The present invention relates to synchronization of time-division communication, and especially relates to a synchronization device and a synchronization method for determining a transmission timing of a station concerned based on transmission timings of other stations.

BACKGROUND ART

Currently, systems (AISs) in which an automatic ship identification device for automatically transmitting and receiving data peculiar to a ship, such as a unique identification, ship's name, position, course, ship speed, and destination is mounted on each ship are employed (for example, refer to Patent Document 1). Here, in the AIS, the time-division communication system is used for communication between respective ships, and synchronization is performed on different standards for different classes. For example, between ships of CLASS A, because GPS devices are mounted on the ships due to the standard, synchronization is performed based on a 1PPS signal of the GPS, and when a GPS signal cannot be received, the synchronization is performed based on the transmission timing of the another ship having received the GPS signal. On the other hand, between ships of CLASS B'CS, a ship concerned acquires transmission timings of other ships for one minute, and the synchronization is performed based on the transmission timings of two or more other ships, which the ship concerned has continued acquiring for one minute.

REFERENCE DOCUMENT(S) OF RELATED ART

[Patent Document 1] Japan Patent No. 3,882,025

DISCLOSURE OF THE INVENTION

Problem(s) to be Solved by the Invention

The method based on the transmission timings of other ships used for the CLASS B'CS, if all the transmission timings of other ships are synchronized with each other, the transmission timing of the ship concerned can also be synchronized with this to share the same slot timing between all the ships.

However, in ships, what have a transmission timing deviated from others may also exist due to hardware factors including degradation with age or the like. For example, FIG. 4 is a plot showing a distribution of the deviation of the transmission timing of each ship with respect to a reference timing based on 1PPS. In this figure, the horizontal axis shows a lapsed time of sampling and the vertical axis shows a slot deviation. As shown in FIG. 4, a group having a deviation of "+0.5" and a group having a deviation of "−0.4" to "−0.2" exist with respect to the reference timing (vertical axis "0") based on 1PPS. In the measuring results, although the number of ships belonging to a range of "0" which synchronize with the reference timing based on 1PPS reaches about 90% of the whole, about 10% of the remaining transmit at different timings from the reference timing based on 1PPS.

For this reason, if the transmission timings continuously acquired for one minute are simply averaged, the average value will deviate from "0" and the ship concerned will be impossible to transmit at the timing corresponding to "0." In addition, if all the ships perform such processing, the transmission timings of the respective ships will not synchronize with each other after all and, thus, the system will fail.

Therefore, an object of the present invention is to realize a synchronization device and a synchronization method that can almost reliably synchronize with other ships during a transmission of a ship concerned in the case where the synchronization is performed with the other ships as described above, even if the transmission timings of two or more other ships are deviated from each other.

Means for Solving the Problems

An aspect of the present invention is directed to a synchronization device including an other-station transmission timing acquisition module for acquiring transmission timings of other stations and a station-concerned transmission timing determination module for determining a transmission timing of a station concerned based on the transmission timings of the other stations. The station-concerned transmission timing determination module of the synchronization device includes a reference timing generation module for generating a reference timing of a fixed time interval, a timing difference calculation module for calculating a timing difference between the reference timing and each of the transmission timings of the other stations, and a timing difference storage module for storing the timing differences. The station-concerned transmission timing determination module of the synchronization device acquires two or more timing differences over a preset time length of the past based on a timing at which the station concerned is going to transmit, counts the number of substantially the same timing differences, and synchronizes the transmission timing of the station concerned with a transmission timing corresponding to a timing difference with the greatest number of count.

That is, a synchronization method according to another aspect of the present invention generates a reference timing of a fixed time interval, calculates timing differences between the reference timing and transmission timings of other stations, acquires two or more timing differences over a preset time length of the past based on a timing at which a station concerned is going to transmit, counts the number of substantially the same timing differences, and synchronizes the transmission timing of the station concerned with a transmission timing corresponding to a timing difference with the greatest number of count.

In the configuration and method, the transmission timings of other ships are acquired over the preset time length of the past (for example, for one minute, described above) with respect to the transmission timing of the station concerned, and the timing differences with respect to the reference timing set in the station concerned are calculated. Because these timing differences have a predetermined distribution as shown in FIG. 4 described above, if the numbers of the respective timing differences are measured and the timing difference with the greatest number of count is adopted as the transmission timing of the station concerned, it can synchronize with a transmission timing which has been used the most by other stations within the predetermined time length of the past with respect to the transmission timing of the station concerned. That is, it is possible to transmit at a slot timing that seems to be the most accurate at a time point of the transmission timing of the station concerned.

Further, the station-concerned transmission timing determination module of the synchronization device according to the present invention classifies the two or more timing differences into difference classes each having a predetermined difference time width, calculates a frequency of the timing differences falling under each difference class to form a histogram, and synchronizes the transmission timing of the station concerned based on the frequency of the histogram.

In this configuration, the histogram that is a distribution of the frequency of the two or more difference classes may be used for the calculation of the timing difference with the greatest number of count. Thereby, the transmission timing of the station concerned can be determined more easily and clearly.

Effect of the Invention

According to the present invention, even if the transmission timings of two or more other stations (other ships) may differ from each other, it can synchronize with the most probable slot timing during a transmission of the station concerned (ship concerned) to perform the transmission of the station concerned.

DESCRIPTION OF NUMERALS

1: Synchronization Device; 11: Received Signal Demodulation Module; 12: Reference Timing Signal Generation Module; 13: Timing Difference Calculation Module; 14: Transmission Timing Determination Module; 3: Transmitting Signal Generation Module; 20: Reception Antenna; and 30: Transmission Antenna.

BEST MODE OF CARRYING OUT THE INVENTION

A synchronization device according to an embodiment of the present invention is described with reference to the figures. Hereinafter, the synchronization device mounted on an automatic ship identification device is described as an example.

Figure 1:
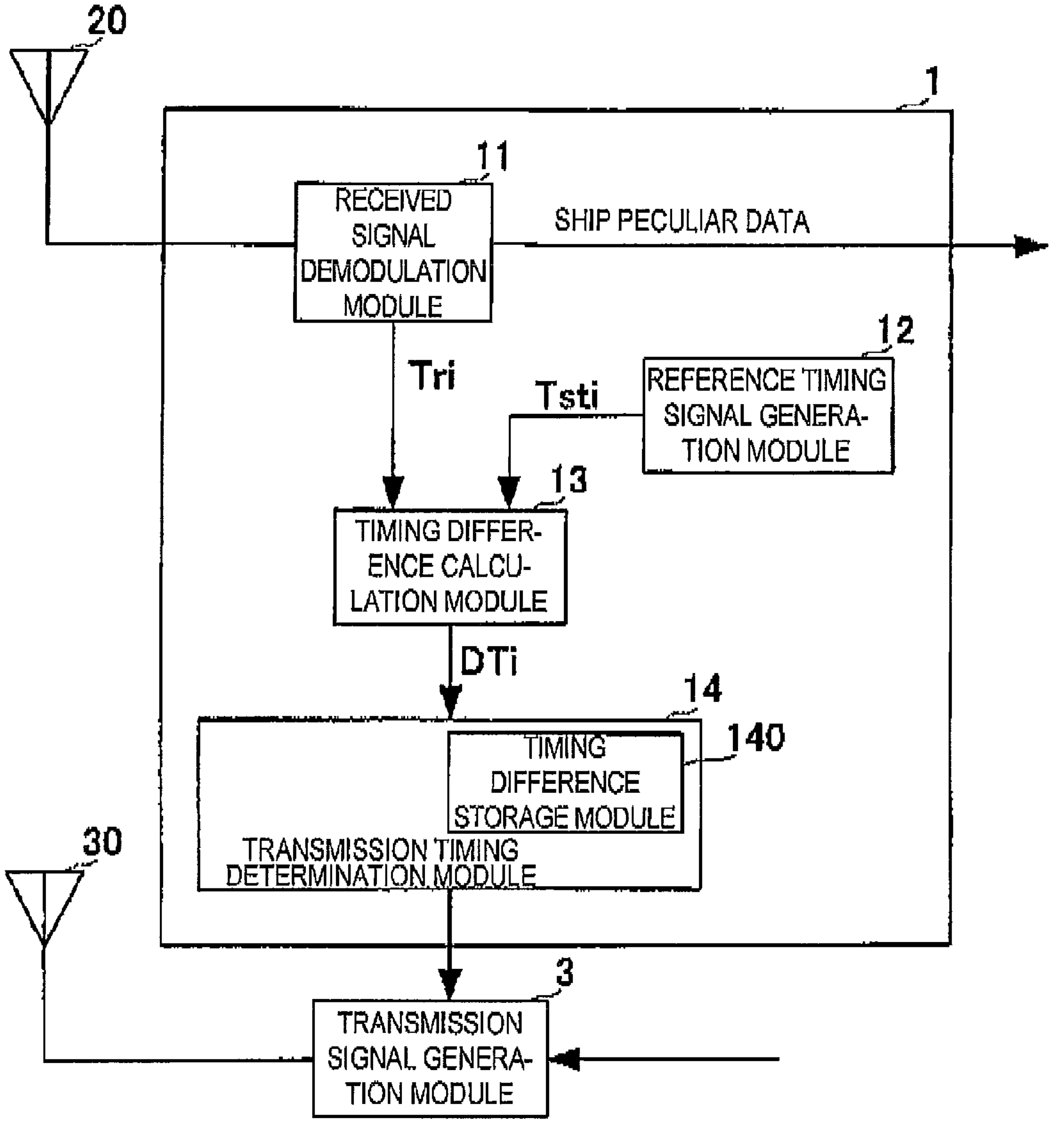
FIG. 1 is a block diagram showing a substantial configuration of a synchronization device according to an embodiment of the present invention.

FIG. 1 is a block diagram showing a substantial configuration of the synchronization device of this embodiment.

The synchronization device 1 of this embodiment includes a received signal demodulation module 11, a reference timing signal generation module 12, a timing difference calculation module 13, and a transmission timing determination module 14.

The received signal demodulation module 11 connects with a reception antenna 20, demodulates an AIS communication signal received by the reception antenna 20, detects respective slot timings (i.e., transmission slot timings of other ships "Tri"), and acquires ship peculiar data. The received signal demodulation module 11 sequentially outputs the transmission timings Tri of other ships to the timing difference calculation module 13. In addition, the received signal demodulation module 11 outputs the ship peculiar data to a to display control device described later (not illustrated).

The reference timing signal generation module 12 includes, for example, an oscillating circuit provided with a crystal oscillator, and outputs a reference timing Tsti at a timing interval according to a slot length of the AIS in advance. The outputted reference timing Tsti is inputted into the timing difference calculation module 13.

The timing difference calculation module 13, if the reference timing Tsti and the transmission timings Tri of other ships are inputted, calculates a time difference DTi (=Tri−Tsti) of these timings (hereinafter, referred to as a "timing difference") based on the reference timing Tsti. Every time the transmission timings Tri of other ships are inputted, the timing difference calculation module 13 calculates the timing difference DTi to output it to the transmission timing determination module 14.

The transmission timing determination module 14 includes a timing difference storage module 140 for time-sequentially storing the timing differences DTi, and sequentially stores the inputted timing differences DTi. Here, in CLASS B'CS of the AIS, because the transmission timings occurring over the past one minute are used for a determination of the transmission timing, the timing difference storage module 140 has a capacity capable of always storing the timing differences DTi for at least one minute, and stores the timing differences DTi during the one minute.

The transmission timing determination module 14, when a transmission start instruction by career sense is received, reads out the timing differences DTi occurring over the past one minute based on a time point at which a ship concerned performs transmission. The transmission timing determination module 14 creates a histogram of the read timing differences DTi. That is, the transmission timing determination module 14 classifies the acquired timing differences DTi occurring over the past one minute into two or more classes each having a predetermined difference width, and then calculates a frequency of each class.

The transmission timing determination module 14 selects a class with the highest frequency based on the created histogram, and then determines a transmission timing based on a timing difference DT' for correction associated with the class concerned. That is, the class with the highest frequency is selected among the transmission timings of other ships within the past one minute before the time point at which the ship concerned performs transmission, and, for example, calculates an average value of the timings contained in the class concerned to set it as a transmission timing of the ship concerned. The transmission timing of the ship concerned may be a mean value of the timings contained in the class concerned, a value obtained by weighted averaging of the timings contained in the class concerned or the like. Thus, because the transmission timing of the ship concerned is in agreement with the transmission timing which is a majority at the transmitting time point thereof, the transmission from the ship concerned can be performed at the transmission timing where there is the least problem in the AIS operation at the transmitting time point. The transmission timing set in this way is outputted to the transmission signal generation module 3.

The transmission signal generation module 3 modulates the ship peculiar data of the ship concerned by a predetermined modulation method to generate an AIS communication signal. Then, the transmission signal generation module 3 outputs the communication signal at the transmission timing given from the transmission timing determination module 14. The outputted communication signal is transmitted to the exterior via the transmission antenna 30.

Next, a method of determining the transmission timing in the transmission timing determination module 14 is described in more detail with reference to the figures.

Figure 2:
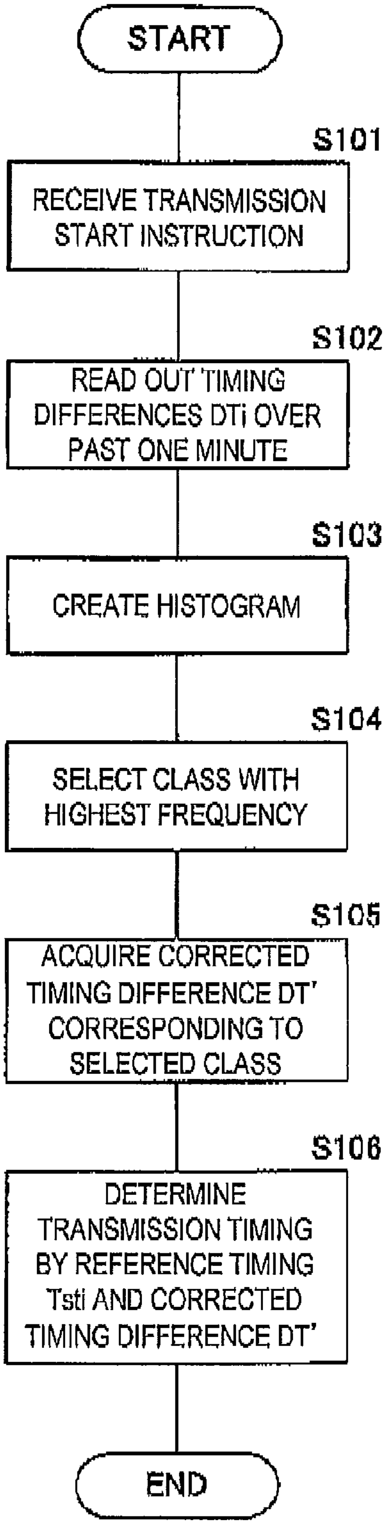
FIG. 2 is a flowchart showing a method of determining a transmission timing.
Figure 3:
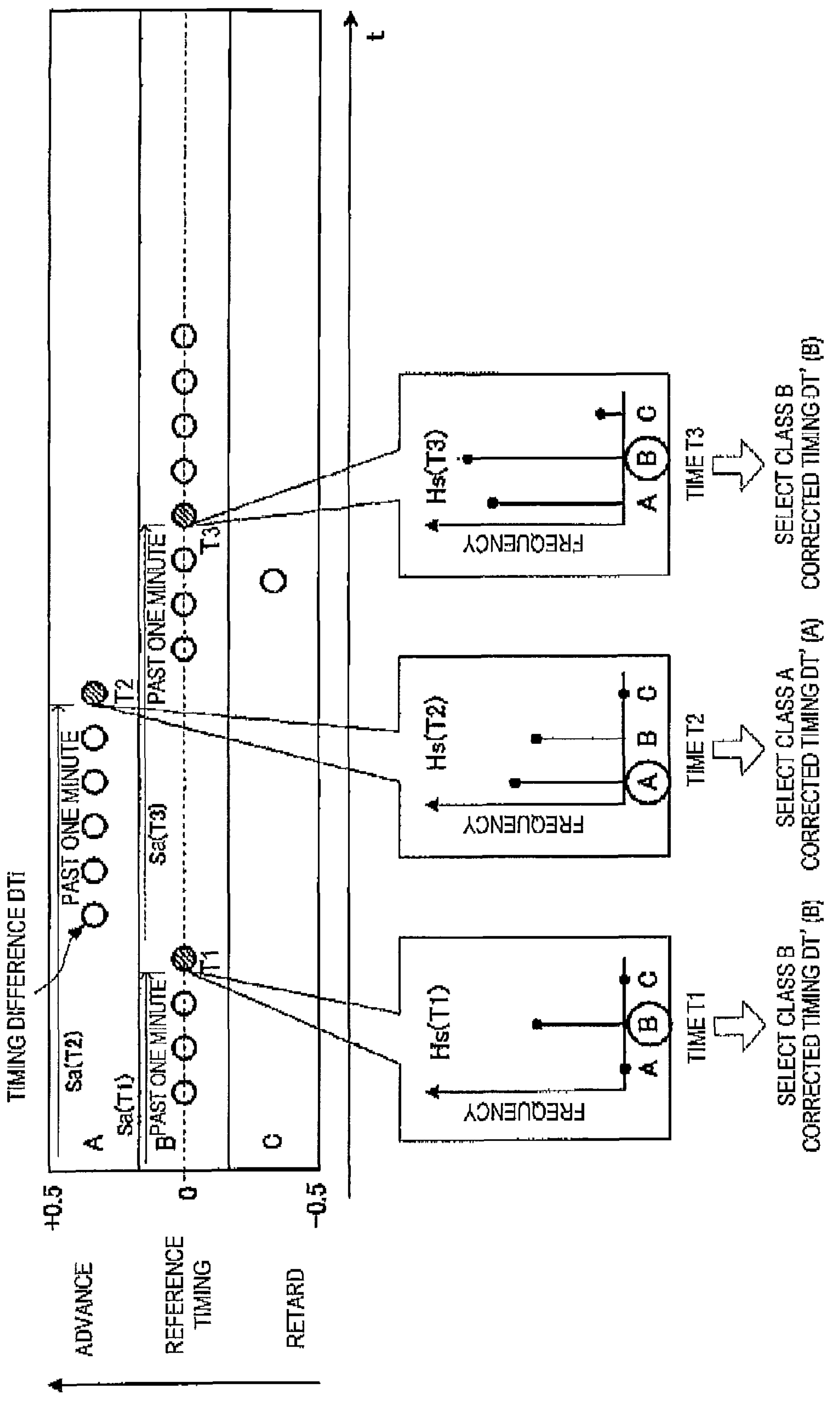
FIG. 3 is a view showing a concept of the method of determining the transmission timing.
Figure 4:
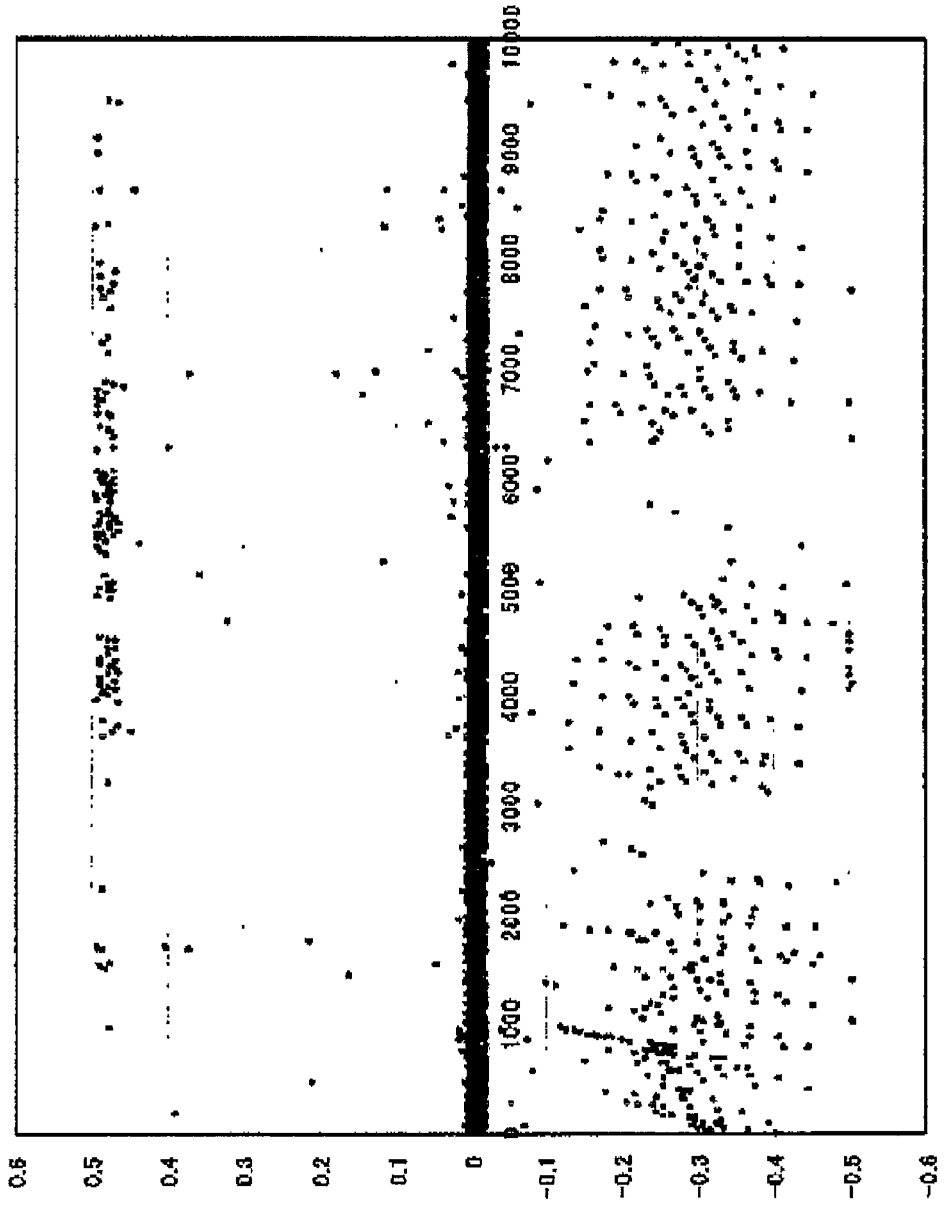
FIG. 4 (Related Art)
FIG. 4 is a view showing a distribution of deviations of transmission timings of respective ships with respect to a reference timing based on 1PPS.

FIG. 2 is a flowchart showing the method of determining the transmission timing. FIG. 3 is a view showing a concept of the method of determining the transmission timing.

The transmission timing determination module 14, when the transmission start instruction is received (S101), reads out the timing differences DTi occurring over the past one minute stored in the timing difference storage module 140 (S102).

The transmission timing determination module 14 creates the histogram using the respective timing differences DTi which are read out (S103). Specifically, the transmission timing determination module 14 sets two or more classes each having the predetermined difference width where the respective timing differences DTi are normalized based on a time length of one slot. For example, as shown in FIG. 3, a value range of the timing differences "−0.5" to "+0.5" is equally divided into three to set three classes of: CLASS A showing a distal part ("+0.5" side) on the advancing side with respect to the reference timing Tsti, CLASS B (proximal to "±0.0") showing a proximal part of the reference timing Tsti, and CLASS C ("−0.5" side) showing a distal part on the retarding side with respect to the reference timing Tsti. Next, the transmission timing determination module 14 classifies the respective timing differences DTi, which are read out, into CLASS A to CLASS C, and then counts a frequency, respectively. Note that the number of classes may be set suitably according to the specification of the synchronization device and the acquisition accuracy of the transmission timing. Here, the setting may be performed automatically or manually by a user.

The transmission timing determination module 14, when the histogram is created, selects the class with the highest frequency among the CLASS A to CLASS C (S104).

The transmission timing determination module 14 acquires the corrected timing DT' set according to the selected class (S105). That is, because the predetermined difference width exists for each class, the corrected timing DT' representing each class is given in advance. This is set to a mean value of upper and lower limits of the timing difference which defines the class, for example.

The transmission timing determination module 14 corrects the reference timing Tsti by the acquired corrected timing DT' to determine the transmission timing of the ship concerned (S106).

In the above-described flow, the creation of the histogram is carried out only once. However, secondary classes may be set with finer difference widths for the class with the highest frequency, and the corrected timing DT' may be set based on a frequency of each secondary class. Further, tertiary classes finer than the secondary classes may be set, and the corrected timing DT' may be set based on a frequency distribution thereof. As described to above, by performing the histogram creation in such a hierarchy, the timing difference to be obtained can be detected with high precision.

Next, the case where the determination processing of such a transmission timing is carried out time-sequentially is described with reference to FIG. 3 as an example.

As shown in FIG. 3, if it determines that the ship concerned performs a transmission at a time T1 by the career sense of the communication slot of the AIS, the transmission timing determination module 14 reads out the timing differences DTi occurring over the past one minute from the time T1, and then creates a histogram (histogram Hs(T1) in the figure). The transmission timing determination module 14 detects that the frequency of CLASS B is the highest based on the histogram Hs(T1). The transmission timing determination module 14 determines the transmission timing based on the corrected timing DT'(B) associated with CLASS B.

Next, if it determines that the ship concerned performs a transmission at a time T2, the transmission timing determination module 14 reads out the timing differences DTi occurring over the past one minute from the time T2, and creates a histogram (histogram Hs(T2) in the figure). The transmission timing determination module 14 detects that the frequency of CLASS A is the highest based on the histogram Hs(T2). The transmission timing determination module 14 determines the transmission timing based on the corrected timing DT'(A) associated with CLASS A.

Next, if it determines that the ship concerned performs a transmission at a time T3, the transmission timing determination module 14 reads out the timing differences DTi occurring over the past one minute from the time T3, and then creates a histogram (histogram Hs(T3) in the figure). The transmission timing determination module 14 detects that the frequency of CLASS B is the highest based on the histogram Hs(T3). The transmission timing determination module 14 determines the transmission timing based on the corrected timing DT'(B) associated with CLASS B.

By performing such processing, the transmission timing of the ship concerned becomes in agreement with the transmission timing referenced the most by other ships at the transmitting time point. Thereby, it is possible to perform the slot synchronization with the maximum number of other ships at the transmitting time point. In other words, this allows the ship concerned to perform a transmission complied with the standard of CLASS B'CS of the AIS the most at the transmitting time point of the ship concerned. In addition, all the ships performing such processing lead to a convergence of the difference in the transmission timings, and as a result, all the ships can share the same slot timing. That is, all the ships can perform transmissions completely complied with the standard of CLASS B'CS of the AIS.

Note that, in the above description, the case where the acquired transmission timings of other ships are simply counted. However, the number of ships which perform the transmission may be counted to create the histogram. In this case, the number of ships can be counted by detecting a transmission source of each transmission timing based on the ship peculiar data.

Further, in the above description, the value normalized based on the time length of one slot is used in setting of each class of the histogram. However, the value may be based on other time lengths, such as a time length of two slots.

INDUSTRIAL APPLICABILITY

The present invention relates to a synchronization of time-division communication, and is particularly suitable for a synchronization device and a synchronization method for determining a transmission timing of a station concerned based on transmission timings of other stations.

What is claimed is:

1. A synchronization device, comprising:

an other-station transmission timing acquisition module for acquiring transmission timings of other stations; and a station-concerned transmission timing determination module for determining a transmission timing of a station concerned based on the transmission timings of the other stations, the station-concerned transmission timing determination module including:

a reference timing generation module for generating a reference timing of a fixed time interval;

a timing difference calculation module for calculating a timing difference between the reference timing and each of the transmission timings of other stations; and a timing difference storage module for storing the timing differences;

wherein a plurality of the timing differences are acquired over a preset time length of the past from a timing at which the station concerned is going to transmit, the number of substantially the same timing differences are counted, and the transmission timing of the station concerned is synchronized with a transmission timing corresponding to a timing difference with the greatest number of count.

2. The synchronization device of claim 1, wherein the station-concerned transmission timing determination module classifies the plurality of the timing differences into difference classes each having a predetermined difference time width, calculates a frequency of the timing differences falling under each of the difference classes to form a histogram, and synchronizes the transmission timing of the station concerned based on the frequency of the histogram.

3. A synchronization method of determining a transmission timing of a station concerned based on transmission timings of other stations, comprising:

generating a reference timing having a fixed time interval;

calculating timing differences between the reference timing and the transmission timings of the other stations;

acquiring a plurality of timing differences over a preset time length of the past from a timing at which the station concerned is going to transmit;

counting the number of substantially the same timing differences; and synchronizing the transmission timing of the station concerned with a transmission timing corresponding to a timing difference with the greatest number of count.

* * * * *